United States Patent [19]

Keller et al.

[11] Patent Number: 4,731,784
[45] Date of Patent: Mar. 15, 1988

[54] COMMUNICATION SYSTEM COMPRISING OVERLAYED MULTIPLE-ACCESS TRANSMISSION NETWORKS

[75] Inventors: Heinz J. Keller, Ruschlikon; Johann R. Mueller, Albis; Ernst H. Rothauser, Reichenburg; Erwin A. Zurfluh, Feldmeilen, all of Switzerland

[73] Assignee: International Business Machines Corp., Armonk, N.Y.

[21] Appl. No.: 833,639

[22] Filed: Feb. 26, 1986

[30] Foreign Application Priority Data

Feb. 28, 1985 [EP] European Pat. Off. ............ 85102205

[51] Int. Cl.[4] ............................. H04J 3/00; H04J 3/16
[52] U.S. Cl. ......................................... 370/88; 370/89
[58] Field of Search .................... 370/85, 88, 89, 4; 340/825.05; 455/607, 608

[56] References Cited

U.S. PATENT DOCUMENTS 4,501,021  2/1985  Weiss .................................... 370/88
4,587,651  5/1986  Nelson et al. ........................ 370/88

Primary Examiner—Michael A. Masinick
Assistant Examiner—Frank M. Scutch, III
Attorney, Agent, or Firm—John B. Frisone

[57] ABSTRACT

In a communication system providing multiple access to transmission facilities for a plurality of stations (17, 21), two separate networks (11, 13) are provided: One is a token ring (11) on which access tokens and data are transmitted, the other is a high-speed optical fiber transmission ring (13) on which only large-volume data blocks are transmitted between particular stations (21) which are attached to both rings, but no access information. A token manager (27) in the token ring (11) provides at regular intervals particular tokens that are only used by the particular stations (21) for obtaining access to the high-speed ring (13), but also provides other tokens for regulating access to the token ring (11) for other stations (17). Special access nodes (23) are provided which allow to connect the particular stations (21) to the high-speed ring (13) without extending its length.

16 Claims, 12 Drawing Figures

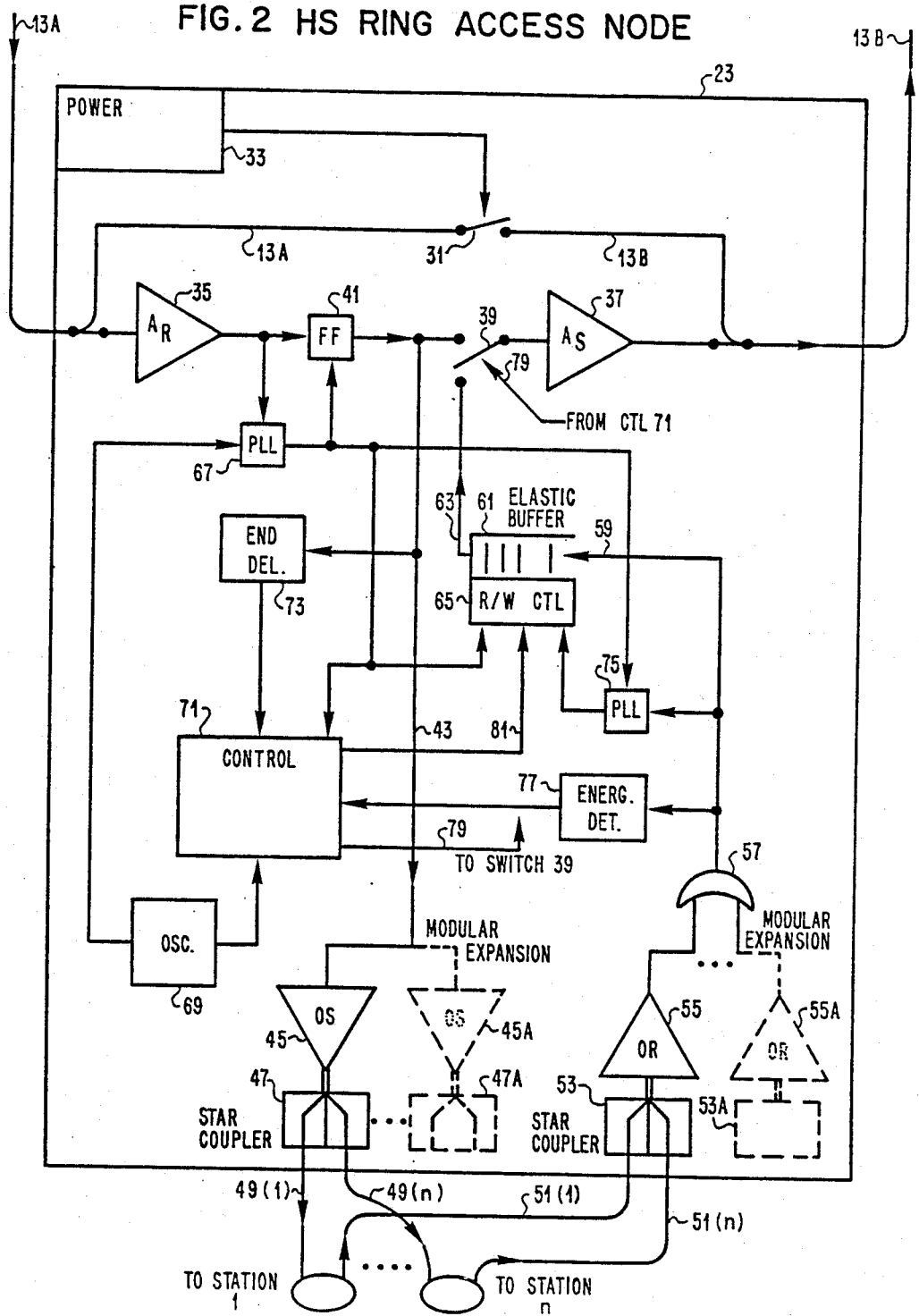
FIG. 2 HS RING ACCESS NODE

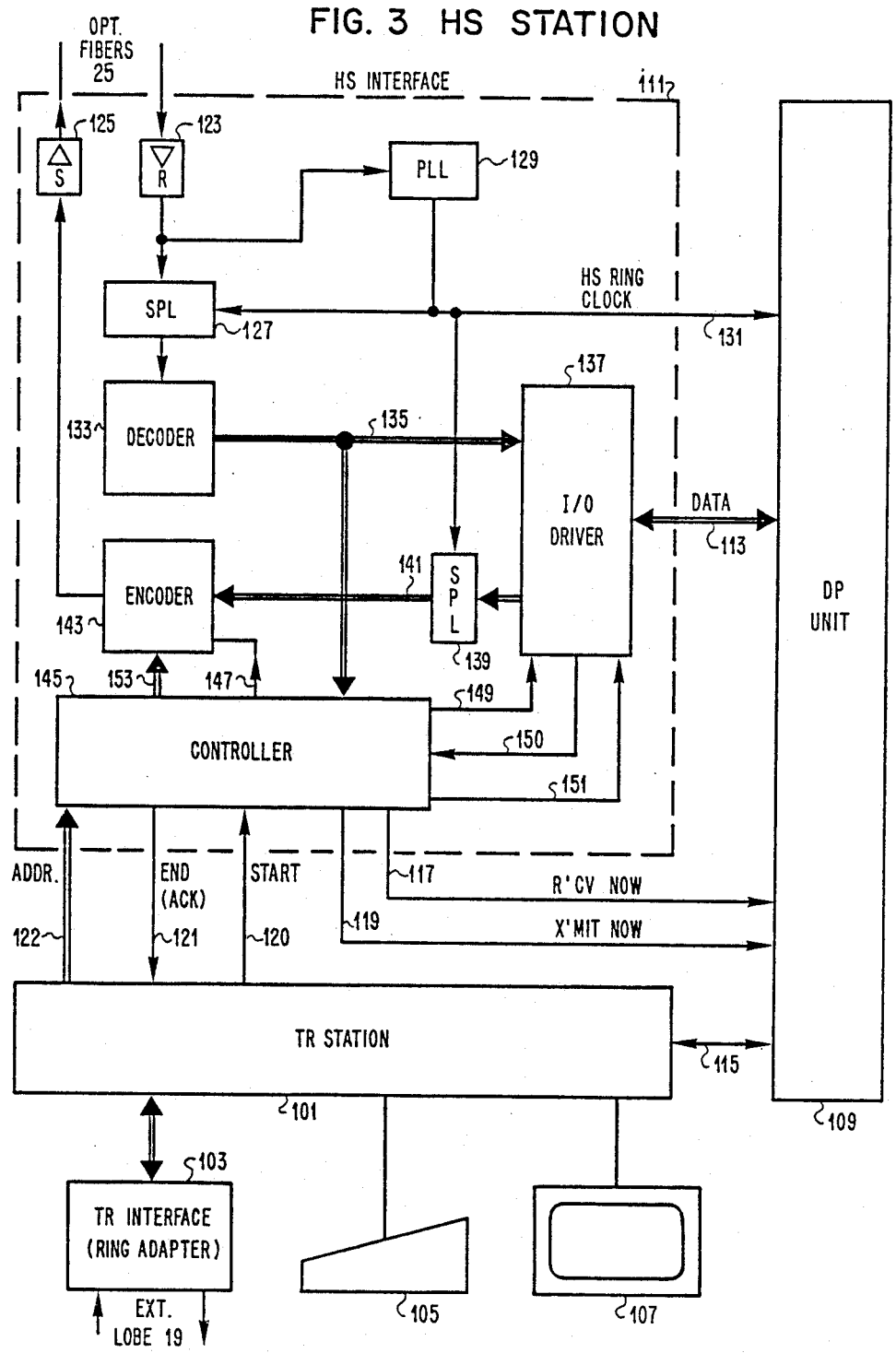
FIG. 3 HS STATION

FIG. 4 TOKEN FORMAT
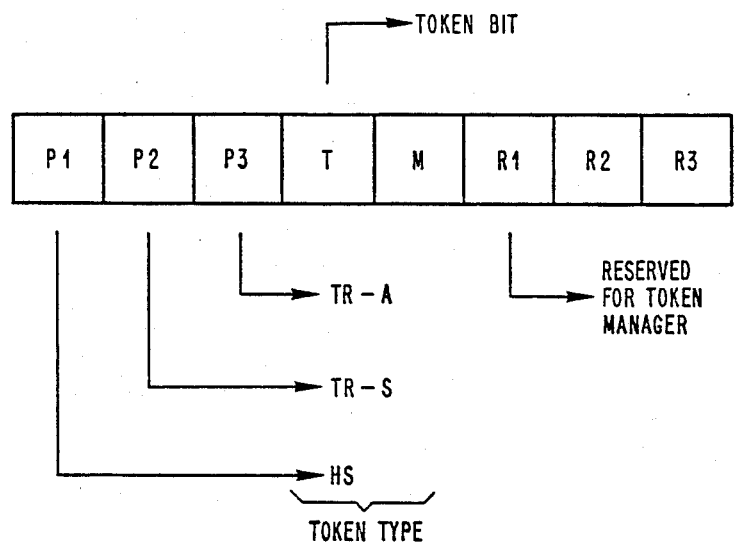
FIG. 7 HS DATA BLOCK TRANSMISSION FORMAT
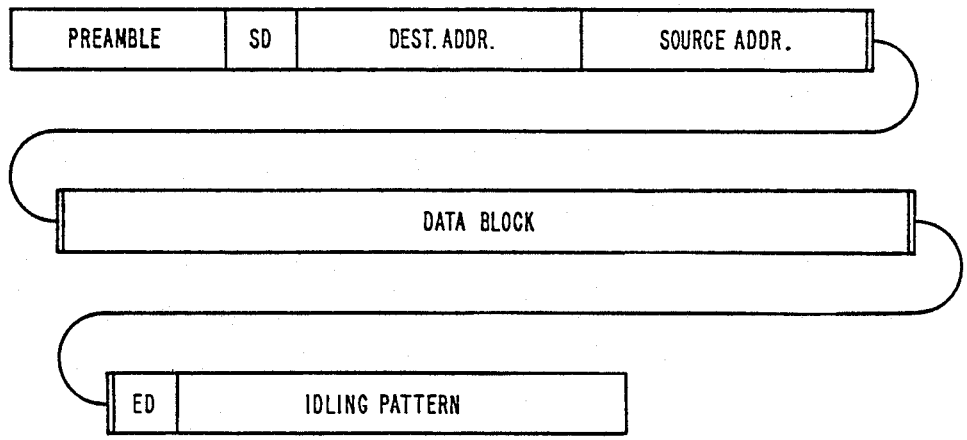

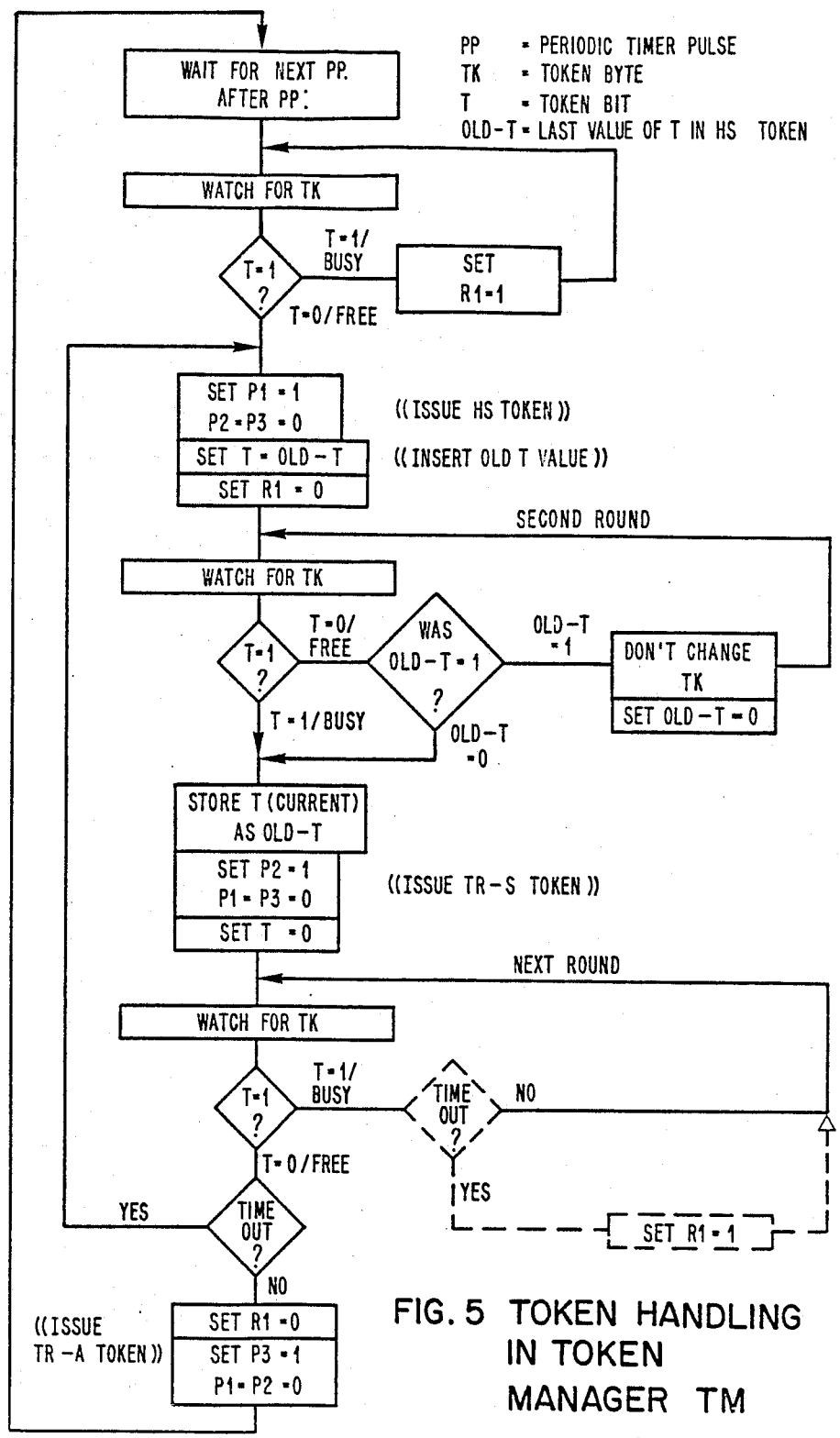
FIG. 5 TOKEN HANDLING IN TOKEN MANAGER TM

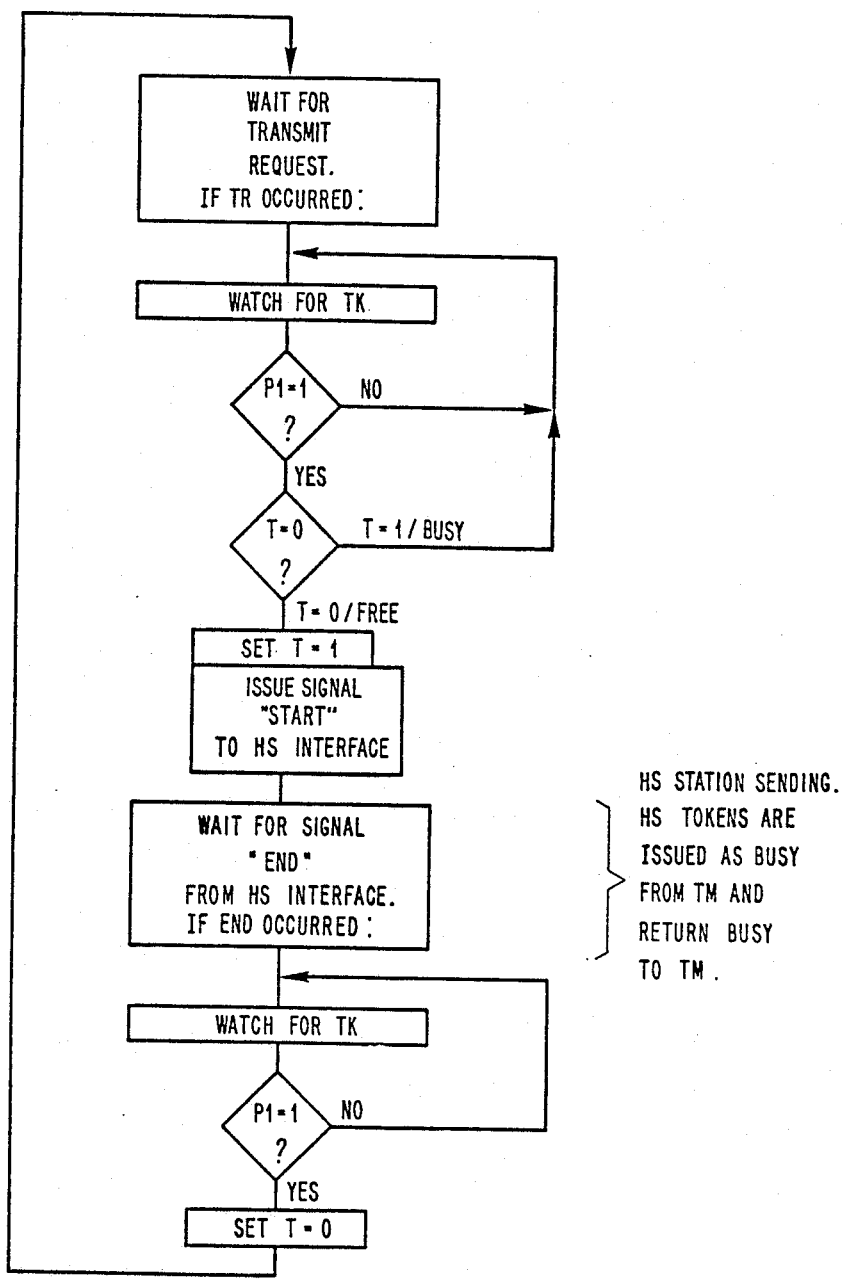
FIG. 6 HANDLING OF HS TOKEN IN HS STATION

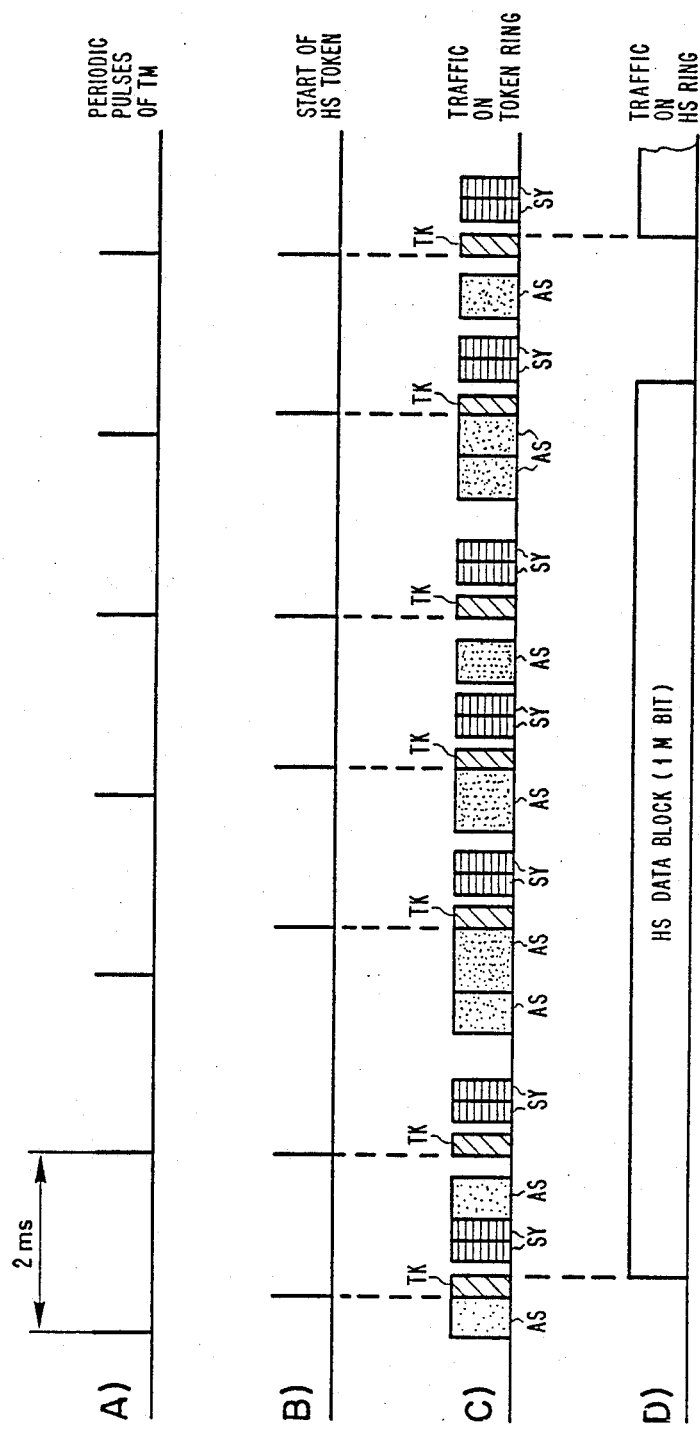
FIG. 8 TRAFFIC EXAMPLE

COMMUNICATION SYSTEM COMPRISING OVERLAYED MULTIPLE-ACCESS TRANSMISSION NETWORKS

FIELD OF INVENTION

The present invention relates to communication systems, and in particular to communication systems in which a plurality of stations can exchange data over a common multiple-access transmission medium.

BACKGROUND OF INVENTION

Many local area networks were proposed in recent years which allow the shared utilization of a bus or ring network by a large number of attached stations. A common problem is the regulation of the access to such a network if the transmission requests occur irregularly so that a fixed time-division multiplex (TDM) time raster is not desirable.

Two major techniques have evolved for regulating access. One is the carrier sense multiple access technique with collision detection (CSMA/CD) in which a station that wants to transmit first listens and only starts sending if the transmission medium is free. If any collision occurs, transmission is retried according to a given algorithm. Another technique is the token access method in which a token representing the right to transmit is passed from station to station so that only one can attempt to transmit at any time.

Token systems are e.g. known from U.S. Pat. Nos. 4,429,405 and 4,482,999, from an article "A token ring network for local data communications" by R. C. Dixon et al., published in IBM Systems Journal, Vol. 22, No. 1 1983, pp. 47-62, and from an article "A local communications network based on interconnected token-access rings: A tutorial" by N. C. Strole, IBM Journal of Research and Development, Vol. 27, No. 5, September 1983, pp. 481-496.

In these prior art systems, the transmission medium is a ring on which the access token as well as the data are passed from station to station in a sequential manner. The mentioned patents and publications also disclose the possibility to transmit synchronous or high-priority data at regular intervals by providing higher priority tokens which are only available to authorized stations.

Though these and many other known systems enable to mix a wide variety of different types of traffic, they have some limitation if bulk transfers of large-volume data blocks are frequently required at high speed. Such transfers may be necessary e.g. for the exchange of whole data bases between computers, or for graphic applications in which the information for rapidly changing displayed images must be sent from one location to another.

The necessity of access control circuitry in the transmission path prevents operation of the network at very high data rates though the medium per se would be able to transfer data at such rates. Furthermore, the transmission of a large-volume data block may require several cycles despite a high-speed transmission rate so that during that time the access would be prevented for stations requiring synchronous transmission at regular intervals.

Some systems are known in which the access information is transmitted separate from the data path, e.g. from an article by D. F. Bantz "Decentralized request resolution mechanism", IBM Technical Disclosure Bulletin, Vol. 20, No. 2, July 1977, pp. 853-855. However, these systems do also not solve the problem of service interruption for synchronous traffic stations by bulk data transfers, and do not allow to transmit data over the separate access line.

OBJECTS OF THE INVENTION

It is an object of present invention to devise a communication system for interconnecting a plurality of stations, that allows the rapid transfer of large-volume data blocks without interrupting the transfer of smaller packets of data, even in synchronous mode.

It is another object to provide a communication system that can be built gradually starting with a basic general purpose multiple-access transmission network and allowing to add the capability for high-speed bulk data transfers. The communication technique thus should allow to use existing token ring local area networks as the basis for a system providing high-speed large-volume transfers.

A further object is a communication system in which groups of stations are connected to a transmission medium in a way that allows high-speed bulk transfers by preventing delays due to station attachments or data path extensions.

DISCLOSURE OF THE INVENTION

The above objects are achieved by the invention which provides a dual-network system in which one network transfers the access information for both and also transfers data in smaller volumes, whereas the other network does not transfer access information but only large-volume data blocks. Stations requiring bulk transfers are connected to both networks so that they can receive and transmit access information over the one network, but can transmit and receive large-volume data blocks over the other, high-speed network under control of the access information.

Groups of stations are attached to a high-speed ring network by access nodes in such a way that they need not be inserted into the ring when being active, but receive all circulating data in a broadcast manner and can transfer data to the access node. The ring must be interrupted for sending data only for a period that is necessary for the transmission of a data block from one station. This is possible because the access information is transferred over another network to which all stations of the group are constantly connected.

Detailed features and advantages of the invention will become evident from the following description of a preferred embodiment which is illustrated by accompanying drawings.

LIST OF DRAWINGS

FIG. 2 is a block diagram of an access node in the high-speed transmission ring of the system of FIG. 1;

FIG. 3 is a block diagram of a station that is connected to both networks of FIG. 1 for enabling bulk data transfers at high speed;

FIG. 4 shows the token format used on the token ring of the system;

FIG. 5 is a flow diagram illustrating the token handling in the token manager that is provided in the token ring shown in FIG. 1;

FIG. 6 is a flow diagram illustrating the token handling in one of the stations that is connected to both networks for high-speed bulk transmissions;

FIG. 7 is a schematic representation of the transmission format for large-volume data blocks on the high-speed ring network; and FIGS. 8a through 8d are time diagrams showing examples different traffic types in the dual-network system using the invention.

DETAILED DESCRIPTION

(1) SYSTEM OVERVIEW

Figure 1:
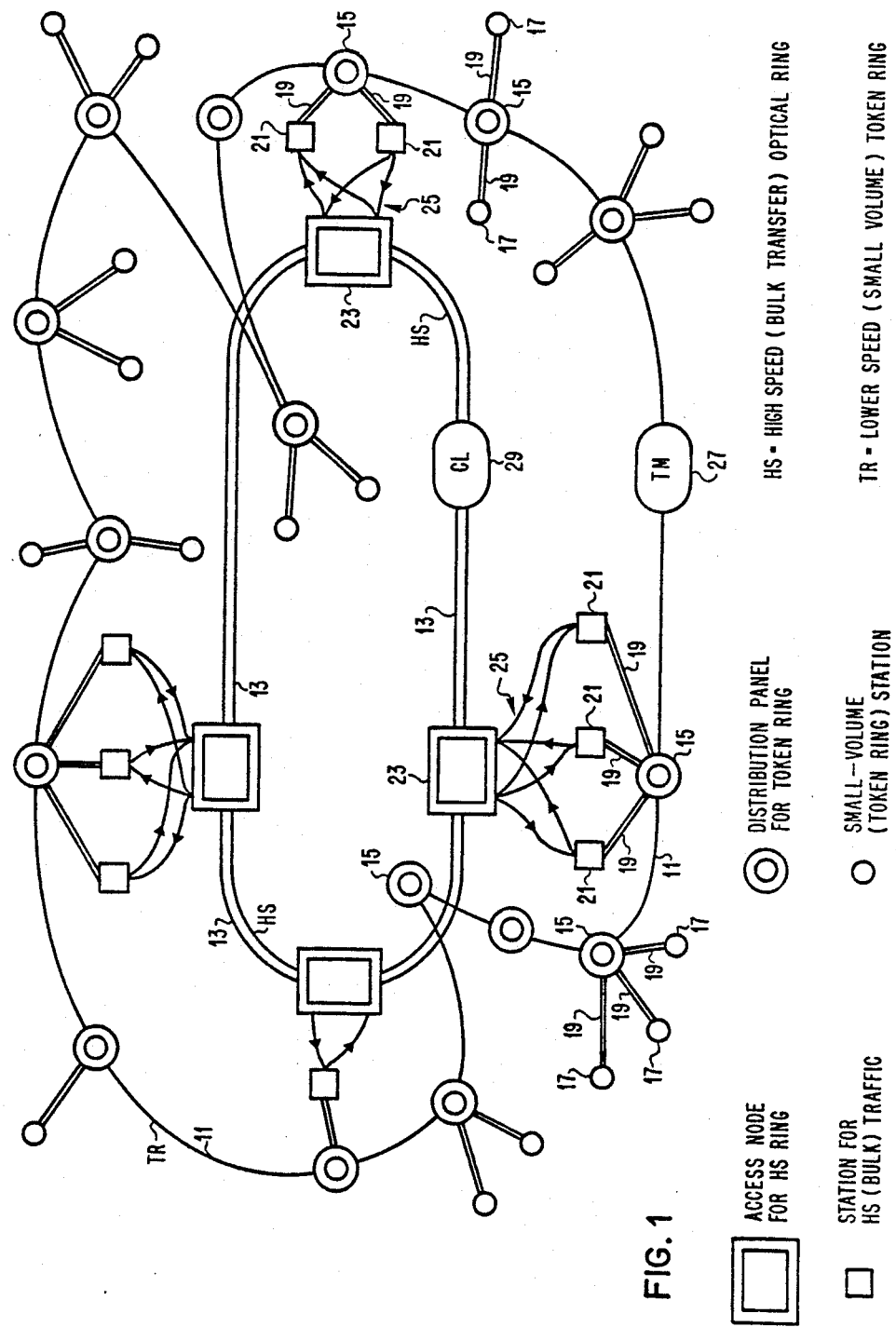
FIG. 1 is an overview of a communication system using the invention.

The overall structure of a communication system embodying the invention is shown in FIG. 1. It comprises two separate networks: A token ring (TR) 11 and a high-speed transmission ring (HS) 13.

Distribution panels 15 (shown as double circles) are connected to the token ring 11 for attaching stations 17 (shown as single circles) via extension lobes 19. Any station 17 and its extension lobe 19 can be inserted into the basic ring or bypassed, depending on the position of switches in the respective distribution panel. Such token ring structure and its access mechanism are well known e.g. from the above mentioned literature and U.S. Patents as well as from the ECMA and IEEE 802 standards on token ring local area networks.

Some particular stations 21 (shown as squares) which require high-speed bulk data transmission are also attached to token ring 11 via extension lobes 19 so that they can be inserted into the token ring like the normal stations 17. Thus, they can send and receive normal message packets on that ring, and in particular they can receive and evaluate tokens.

The high-speed transmission ring 13 (which will be shortly termed "HS ring" in the following description) comprises a few distribution panels or access nodes 23 (shown as double-framed rectangles), each for attaching a group of stations 21 to the HS ring via lines 25. HS ring 13 and extension lines 25 consist of fibers for optical data transmission. The basic token ring 11 and extension lobes 19 are electrical transmission lines in the present example but could as well be implemented as optical fiber media.

Each of the two rings also includes one unique unit for access control and timing, respectively: A token manager (TM) 27 is provided in token ring 11 for issuing special tokens at regular intervals. It can also include a token monitoring function and can provide clocking signals. Operation of such a token manager was also described in above mentioned literature and U.S. Patents. HS ring 13 includes a clock unit (CL) 29 which, besides repeating data signals it receives on its input, issues an idling signal constituting clocking information when no data are transmitted on HS ring 13.

The operation principle of the whole system is as follows: Token ring 11 serves for data transmission between stations 17 and 21, and transfers tokens as access information for these stations. HS ring 23 serves only for transmitting data between stations 21 but does not carry any access information. The information for granting stations 21 access to the HS ring is transferred via token ring 11. For this purpose, at least two different kinds of tokens are provided: One for regulating data transmission access to the token ring, and the other kind for regulating access to the HS ring. Using a single standard token format, the distinction can be made by priority bits. (As will be seen later, in present embodiment actually three different tokens for three kinds of traffic are provided: Traffic on the HS ring, and synchronous as well as asynchronous traffic on the token ring.)

(2) ENVIRONMENT, TYPICAL STATIONS AND TRAFFIC CHARACTERISTICS

For better understanding the purposes and advantages of the communication system, the types of stations attached to each of the two networks, and the type of data traffic transferred over each of the two networks is briefly outlined below:

Token ring and stations 17: The stations will be terminals for single office users including a keyboard and a display and/or a printer. Characteristics of the traffic are that the messages are relatively short (in the order of 1 kbit), that the transmission need not be very fast, but that a prompt response is required when a station needs a data transmission. Distribution panels 15 are provided throughout a building in each office or at least on each floor, the token ring 11 running through all these locations. Extension lobes 19 which are connected at one end to a distribution panel terminate in a wall outlet in an office, for conveniently plugging in a work-station 17, as is well known already.

HS ring and stations 21: Stations 21 are limited in number and require, as was already mentioned, bulk data transmission. They include host computers, graphics terminals requiring rapid transmission of whole image frames, and switching units or PBXs to which telephone stations are attached. Characteristics of the traffic are that the messages to be transferred are of large volume (in the order of 1 Mbyte), that the transfer between source and destination must be effected rapidly (because of the large volume), but that a certain response delay is acceptable because of the buffering capacity of these stations.

In the following, first a more detailed description of the HS ring access nodes 23 and of the special stations 21 will be given. Thereafter, token handling and the simultaneous operation of both rings will be explained. Finally, some possible alternative embodiments of the dual-network overlay system will be mentioned briefly.

(3) HS RING ACCESS NODES

A block diagram of an access node 23 is shown in FIG. 2. It is connected to an incoming branch 13A and an outgoing branch 13B of the optical fiber HS ring 13. An optical bypass switch 31 directly connects the ring branches to bypass the node if it is not powered. When power is switched on, a respective control signal from power unit 33 opens the bypass switch. An optical receiver (AR) 35 amplifies the signals incoming on ring branch 13A and converts them to electrical signals. The counterpart is an optical sender (AS) 37 which accepts electrical signals and converts them to optical signals which are furnished to outgoing ring branch 13B. A selector switch 39 transfers either the received ring data which are delayed in a flipflop 41, or data to be transmitted from the node, to optical sender 37.

Flipflop 41 is provided for sampling the incoming data signal with a regenerated clock signal. The output of flipflop 41 is a "received data" line 43 on which data can be transferred to the stations attached to the node. It is connected to an optical sender (OS) 45 which converts the electrical signals to optical signals. An optical star coupler 47 distributes the output of optical sender 45 in parallel to each of n output lines (optical fibers) 49 (1) ... 49(n) which are connected to the inputs of stations 21(1) ... 21(n). The outputs of these stations are connected to node input lines 51(1) ... 51(n) which are combined in optical star coupler 53 so that the optical output signals of all stations of the group are applied in parallel to optical receiver (OR) 55 which converts them to electrical signals. (Of course the protocol ensures that only one station at a time will be transmitting data). The station output data are transferred in electrical form via an OR gate 57 and a "transmit data" line 59 to an elastic buffer 61. When data are read out of this buffer they appear on line 63 from where they can be transferred via selector switch 39 to the optical sender 37. For elastic buffer 61, read/write control circuitry 65 is provided to ensure properly timed buffering operation.

Though the access node needs not much intelligence (because it needs not to handle the access protocol), a minimum in timing and control circuitry must be provided. A phase locked loop circuit (PLL) 67 regenerates a clock signal from the received data stream with the aid of a local crystal oscillator 69. Its output signal is provided to flipflop 41 for sampling the incoming data signal, to read/write circuitry 65 of the elastic buffer for controlling the readout of buffered data at the correct rate, and to a control unit 71. The local oscillator signal is also provided to control unit 71 to ensure proper operation in case the PLL looses track. An end delimiter detector 73 which is connected to received data line 43 provides a respective control signal to control unit 71. A second PLL circuit 75 is connected to the transmit data line 59 and to the output line of the first PLL 41, for deriving a clock from the data arriving from a station for transmission (used for writing these data into buffer 61 at the correct rate). Furthermore, an energy detector 77 is connected to transmit data line 59 and transfers, when data signal energy appears on that line, a respective indicator signal to control unit 71. This unit controls the setting of selector switch 39 via line 79, and also the begin and the end of writing and reading in elastic buffer 61 via control line 81 and read/write circuitry 65.

Access node 23 operates as follows: Normally, all data signals arriving on optical fiber 13A are repeated on optical fiber 13B but are simultaneously transferred, via optical sender 45 and fibers 49, to all stations attached to the node. When any of the stations starts to send a data block (for which it gets authorization via the token ring and not via the HS access node), the data signals appearing on transmit data line 59 cause that a respective indication is sent to control unit 71, and also cause a locking of second PLL 75 to the phase of the data signal and furnishing of a clock signal to buffer read/write circuitry 65. As will be shown later in somewhat more detail, each data block that is released from a station for transmission on the HS ring is preceded by a preamble, a start delimiter and address information, and trailed by an end delimeter, which in turn is followed by an idling pattern.

After receiving the energy detect indication, control unit 71 sends (with a delay corresponding to the preamble duration) a control signal to selector switch 39 which then interrupts HS ring 13 and connects the output of elastic buffer 61 to optical sender 37. Simultaneously, control unit 71 sends a start signal to read/write circuitry 65 which then, under the control of the clock signals from the two PLL circuits, writes data into and reads data out of elastic buffer 61. Thus, data arriving from a station are transmitted on HS ring 13 (and any data incoming on the ring would not be repeated). The data block now propagates around HS ring 13 until it arrives at its node of origin. There it is transferred to all attached stations, i.e. to the station sending it as well as to the other stations of the respective group. When the end delimiter of the block arrives, an indication is sent from detector 73 to control unit 71 which then will cause, via control lines 79 and 81, a resetting of selector switch 39 to its original position (closing the HS ring) and a notification of read/write control circuitry 65 to stop writing of data into and reading of data out of elastic buffer 61 (and to reset the buffer to its middle position).

For some time after transmission of the end delimiter, an idling pattern is transmitted from the sending station and forwarded by the access node. This time is selected long enough to allow the end delimiter of any data block to return to its access node of origin before the idling pattern transmission ends. After turning over of selector switch 39, the idling pattern arriving will be repeated. Thus an idling pattern propagates in the HS ring until a new data block transmitted from another node starts.

(4) SPECIAL STATIONS FOR HS DATA TRAFFIC

FIG. 3 shows a block diagram of one of the special stations 21 which are connected to HS ring 13 as well as to token ring 11.

The complex HS station comprises a normal token ring station (TR station) 101 which is connected to the token ring by a TR interface or ring adapter 103 as is well known. TR station 101 has a keyboard 105 and a display 107 so that an operator can exchange messages with other such stations over the token ring. The station can also handle access protocols using tokens.

An important portion of the complex HS station is a data processing unit 109 which may be a graphics application unit, or any other equipment requiring bulk data transfers. This unit is connected to the HS ring 13, via optical fibers 25, by a HS interface 111. Data are transferred from DP unit 109 to interface 111 and vice versa via transfer lines 113.

For the interchange of data and various control information, TR station 101 and DP unit 109 are connected by interconnecting lines 115. Some control and address lines between units 101, 109, and 111 that are of interest for present invention are shown separately in FIG. 3: Control line 117 for a signal "receive now", control line 119 for a signal "transmit now", control line 120 for a signal "start", control line 121 for a signal "end" (end delimiter occurred) which may also be considered an acknowledgement signal, and address lines 122 for transferring a destination address and the own source address of the HS station. These lines are important for interrelating transfer of accessing information on the token ring with bulk data transfers over the HS ring.

Some details of HS interface 111 will be given in the following. It contains an optical receiver 123 and an optical sender 125 as converters between optical fibers 25 (lines 49 and 51 of FIG. 2) and the electrical circuitry of the interface. A sampler 127 is provided for sampling the received signals under control of a clock signal from a PLL circuit 129. PLL circuit 129 constantly receives from the HS ring either a data stream or idling patterns and furnishes on line 131 constantly a HS ring clock signal which is also transferred to DP unit 109. The sampled data are converted by decoder 133 from a transmission code into a code suitable for processing and are transferred over lines 135 to an I/O driver 137.

The driver is connected via data lines 113 to storage or buffering circuitry in DP unit 109.

For transfers in the other direction, I/O driver 137 receives the data from DP unit 109 and furnishes them via a sampler 139 (which is also connected to clock line 131) and transfer lines 141 to an encoder 143. The output of this encoder is connected to optical sender 125.

A controller 145 is provided for handling data transfers between HS ring 13 and DP unit 109 through HS interface 111. It receives the transmit start signal on line 120 and the destination/source addresses on lines 122 from TR station 101. It furnishes the receive and transmit control signals on lines 117 and 119 to DP unit 109 and also furnishes the end signal on line 121 to the TR station. Controller 145 exchanges control signals with encoder 143 and I/O driver 137 over lines 147, 149, 150, and 151, respectively. Signals exchanged will be briefly explained in the operation description. Controller 145 is also connected to encoder 143 by lines 153 for providing, at appropriate times, a preamble, delimiters, addresses and idling patterns that complete a mere data block furnished by DP unit 109, to a data transmission block whose format is given in FIG. 7 (to be explained in section 6).

Controller 145 is further connected to decoder output lines 135 to receive all incoming bytes from the HS ring, so that it can compare received address bytes (which appear after a start delimiter) to a locally stored station address, to issue a control signal in case of a match.

Operation of the HS station for transmitting and receiving large-volume data blocks is as follows: Preliminary information is exchanged between TR station 101 and DP unit 109 via lines 115. This may also include the communication of messages over the token ring 11 with other stations involved (e.g. for setting up of input buffers). TR station 101 will know when the transmission of a data block from DP unit 109 is due and will have the required destination address. It then tries to get the HS token which is circulating on the TR ring in regular intervals. When it seized a free HS token (by setting T=1), it transfers the required destination address for the data block to be transmitted and the own station source address to controller 145 and also activates the signal "start" on line 120. Controller 145 then enables encoder 143 (line 147) and starts sending (over lines 153) to the encoder a preamble pattern, a start delimiter, and the destination and source addresses. Then, it activates the signal "transmit now" on line 119 to DP unit 109 and enables I/O driver 137 (line 149). DP unit 109 starts sending (under control of the HS clock signal it receives on line 131) the data block over lines 113 to the interface 111 which transfers the block over lines 25 to the access node of HS ring 13. End of the data block is noticed by controller 145 in the signal on line 150 from the I/O driver. Thereupon, the controller appends an end delimiter to the data block (over lines 153), activates the signal "end" on line 121, and disables the I/O driver. It then provides, for a limited time duration, an idling pattern for transfer to the HS ring, and thereafter disables the encoder. In response to the "end" signal, TR station 101 looks for the next HS token (which should be busy) and releases the token by settint T=0. This ends the transmission operation for this HS station.

For receiving a data block from the HS ring, no access authorization by a token is required. Information announcing the arrival of a data block for the HS station may be given to TR station 101 in advance. The actual arrival of a data block for the respective station is noticed by recognizing the destination address in that block. Controller 145 compares all incoming address bytes (which appear always after a start delimiter) on line 135 to the locally stored station address. In case of a match it activates the signal "receive now" on line 117 and enables I/O driver 137 (over line 151) so that the arriving data stream is decoded and transferred into the storage (or buffer) of DP unit 109. End of the data block is recognizable in the signal on line 150 from I/O driver 137. Controller 145 will then disable the I/O driver and activate the "end" signal on line 121. TR station 101 then can transfer acknowledgement information over the token ring 11 if required.

(5) FRAME AND TOKEN FORMAT ON THE TOKEN RING

The frame format used on token ring 11 is that which is known from the ECMA (and IEEE 802) standards for token ring local area networks: After a start delimiter follows an access control field (token field), destination address, source address, information field (data), check sequence, and then an end delimiter.

The standard access control or token field which comprises eight bits and which is of particular interest to present invention is shown in FIG. 4. It comprises three priority bits P1, P2, P3, the token bit T, and token monitor bit M, and three reservation bits R1, R2, and R3. A frame that is only used for access control consists only of a start delimiter, the access control field (token field), and an end delimiter.

The token manager 27 in token ring 11 issues such access frames or token frames. In the present system three kinds of tokens are provided: A HS token for regulating access on the HS ring; it is identified by P1=1, P2=0, and P3=0. The other two token types are for regulating access on the token ring: A TR-S token for synchronous traffic (P1=0, P2=1, P3=0) and a TR-A token for asynchronous traffic (P1=0, P2=0, P3=1). The priority of these tokens is shown by the bit pattern: HS tokens have highest priority, TR-S tokens are of medium priority. and TR-A tokens have lowest priority. Instead of using a 1-out-of-3 code to distinguish three priorities, one could of course use a 3-bit binary code for combined bits P1, P2, P3 to distinguish eight different priorities.

The priority bits can only be changed by the token manager 27. The same is true for the reservation bits. In present embodiment, only R1 is used; R2 and R3 are not used. The token manager sets R1=1 if it wants to change the priority bits; no other unit can then seize the token. Use of the token bit T and the monitor bit M are as known already from the prior art. T=0 indicates a free token. A unit that wants access sets the token bit T=1, and later (after transmission) issues a token field with T=0 again.

Issuing and handling of tokens by token manager 27 is now explained with reference to the flow diagram of FIG. 5.

Token manager 27, at regular intervals (e.g. 2 milliseconds) reserves the token by setting R1=1 and when it can seize it (i.e. when the token became free), issues a HS token with P1=1. Any HS station 21 then can seize the token to get access to the HS ring. When the HS token returns, the token manager issues a free TR-S token with P2=1, giving all stations on the TR ring which are authorized for synchronous traffic a chance to transmit (one after the other, of course, as is know from U.S. Pat. Nos. 4,429,405 and 4,482,999 that were mentioned already). When finally the TR-S token returns with T=0 (free synch token), the token manager issues a free TR-A token with P3=1 thus giving all low priority stations on the TR ring a chance to transmit, until the token manager reserves the token again for higher priority traffic. In case the basic token time period of 2 ms had run out already, no asynchronous traffic would be allowed and a HS token would be issued immediately (instead of a TR-A token).

There is one particularity in handling of the HS tokens. When a HS token returned after one circulation with T=1, i.e. if it was busy, the token manager stores this fact and issues the next HS token as being busy, T=1. The HS station that had access to the HS ring is responsible for releasing the HS token in a later token period by setting T=0. A HS token that was issued as busy by the token manager and returns as free after one circulation must be issued again by the token manager for a second circulation to give the HS stations upstream of the one that last transmitted also a chance to grab the HS token. In this situation the HS token will be replaced by a TR-S token only after two circulations.

Handling of the HS token in a HS station 21 is now briefly explained with reference to the flow diagram of FIG. 6. When the TR station 101 of a HS station 21 determines that a transmission from its DP unit is requested or due, it tests all tokens passing on token ring 11. If it detects a HS token (P1=1) that is free (T=0) it seizes the token by setting T=1, and then issues the "start" signal to the HS interface. The HS station can then transmit a HS data block over HS ring 13. During that time, several HS tokens may be issued but all will be busy so that the sending HS station needs not to watch for tokens. Only when the TR station receives the "end" signal from the HS interface it will start again to look for HS tokens. The next arriving HS token will be busy, and the TR station will then release it by setting T=0.

(6) BLOCK FORMAT ON HS RING

The block format that is used for bulk transmission of data was mentioned already above and is schematically shown in FIG. 7. Each block is preceded by a preamble of given duration to allow the circuitry in the access node to synchronize to a sudden transmission from one of its attached stations (of which it is not aware in advance). The preamble is followed by a start delimiter, a destination address, and a source address. Thereafter follows the data block per se (which is furnished by DP unit 109), suitably coded for transmission. After the data block, an end delimiter is appended to allow the access node to react properly at the end of transmission. The end delimiter is followed by an idling pattern. Preamble and idling pattern as well as the start and end delimiters and the destination and source addresses are provided by HS interface 111 in HS station 21 which was described in section 4 in connection with FIG. 3.

(7) EXAMPLE OF TRAFFIC ON BOTH RINGS INCLUDING TOKENS

FIG. 8 is a time diagram of the traffic including HS tokens and data packets on TR ring 11 and bulk data blocks on HS ring 13. The first row (A) shows the time instants when a timing pulse is issued in token manager 27. They occur at exact intervals of 2 milliseconds.

The second row (B) shows the instants when HS tokens are issued by the token manager. Some of these instants coincide with a timing pulse of row (A), i.e. when no traffic is on the token ring. Others are delayed with respect to the timing pulses, i.e. when a data packet is in transmission on the token ring whose end must be awaited.

The third row (C) shows the traffic on token ring 11. AS and SY designate asynchronous and synchronous data packets, respectively. TK designates a HS token (start delimiter, token byte, end delimiter) which is not accompanied by data but requires the token ring for one or two circulations. The TR-S and TR-A tokens are not shown separately because they are part of the respective packet including data. (Of course some TR-S or TR-A tokens may circulate separately without data, i.e. when no transmit requests are pending, but these cases are not shown in FIG. 8 for the sake of clarity).

From rows (A) . . . (C) it can be seen (as was mentioned above) that a HS token is issued immediately after a periodic timing pulse if no data packet circulates on the token ring. Otherwise, the end of the respective asynchronous data packet is awaited but the priority bit R1 is set to 1 in the TR-A token. A HS token is then issued after the end of the packet transmission.

The HS token makes only one (or two) circulations and then a TR-S token is issued. A number of synchronous data packets will then follow. In the example, two packets are shown for each period assuming that two synchronous stations are active. When the last active synchronous station was served, a TR-A token is issued and a variable number of asynchronous data packets of various lengths may follow. Then, there may be some idling before the next HS token circulates, but in many cases the last asynchronous packet will directly be followed by the next HS token.

The last row (D) in FIG. 8 shows the traffic on HS ring 13. The transmission of a large block of data (e.g. 1 Mbyte) will start after a HS token. Such transmission may last over several periods. During that time HS tokens will be issued by the token manager but will always be busy (as was mentioned above already). After end of the HS data block transmission, the next circulating HS token (in the FIG. 8 the last one in row (C)) will be set free by the HS station that transmitted. Then the next active HS station down the HS ring can grab the token and start transmitting its HS data block (right end of row (D)). If no station between the one last transmitting and the token manager grabbed the token, it will circulate another time (as was also mentioned above already) to give HS stations upstream of the one last transmitting also a chance.

FIG. 8 shows that there is always a gap between two HS data block transmissions. This is due to the fact that the HS token is transferred separately from the data so that no immediate passing of the transmission right is possible from one station to the next. However, these gaps will take in average only 10% of the total available transmission time on the HS ring (assuming that a HS token circulation on the token ring requires ca. 200 microseconds and that the period of the token manager is 2 milliseconds).

(8) ALTERNATIVE EMBODIMENTS

The invention can of course be embodied in several different ways and systems, and some alternative possibilities are briefly outlined below.

* Multiple Token Rings: The HS overlay ring can be combined not only with a single token ring as described above, but also with a system of multiple token rings which are interconnected by bridges and a backbone ring. The HS stations attached to the HS ring would then be connected to different token rings (but any HS station only to one of the token rings). The HS token which must be offered sequentially to all HS stations must circulate in such a system sequentially through all token rings which cooperate with the HS ring. This could be achieved by a supertoken which, when it circulated on one ring, is passed through a bridge and the backbone to the next ring, and so on until it returns to the first ring.

* Multiple HS Rings: A single token ring could be the basis of a system with several HS overlay rings. In this case, the token ring must provide several distinguishable HS tokens, one for each HS ring. This is well possible if the priority bits P1 ... P3 are not used individually but as a three-bit code word, allowing eight different priorities. Three or four of these bit combinations could be used to distinguish three or four different HS tokens which would have to be issued by the token manager sequentially at the beginning of each token period, prior to issuing the first TS-S token (synchronous token for the token ring itself).

* Other Than Ring Configuration: The overlay network which is a ring in the described embodiment can as well be embodied as a bus system. It is just necessary that each of the HS stations along the bus is connected also to the token ring.

* Parallel Configuration: In the embodiment above described, the token ring and the HS ring have different configurations which will be most probably desirable as was mentioned above: The overlay ring then needs only connect a few stations which require large-volume service. However, depending on the case both rings could be absolutely parallel, with each station being connected to both networks. Then any station has the choice to use one or the other ring for data transmission, depending on the application currently handled.

* Transmission of TDM Data in Single HS Data Blocks: The HS ring can also be used for transmitting TDM frames from one facility to another if both are connected to the ring by a HS station. Each such facility would provide, at regular intervals, a frame of information into which it has multiplexed the data of many sources, and would then send it over the HS ring to a respective partner facility, and it would decompose a TDM frame received as HS data block as usual for such frames. Because of the regular issuance of the HS token the required synchronous transportation of the TDM frames (with minor time variations) is possible.

* Time-Out in Access Node: In the above embodiment, the HS access node interrupts the ring when a station of its group has access to the HS ring and transmits, and it closes the ring after reception of the end delimiter of the HS data block. To avoid permanent interruption of the HS ring in case of loss of the end delimiter or failure to recognize it, a time-out circuit can be provided in the control unit of the access node which causes closing of the ring by the selector switch if the ring interruption lasts longer than a preselected time.

We claim:

1. A communication system comprising:
   a first transmission network (11);
   a plurality of first station means (17) connected only to the said first transmission network for receiving and sending signals thereover,
   each said first station means including first decoding means for decoding and detecting first network control messages received over said first transmission network, and
   first data transmission means responsive to a said decoded and detected first network control message for transmitting data messages over said first transmission network whenever the station has a data message to send;
   a second transmission network (13);
   a plurality of second station means (21) connected to the said first and second transmission network for receiving and sending signals thereover,
   each said second station means including second decoding means for decoding and detecting second network control messages received over said first transmission network, and
   second data transmission means responsive to a said decoded and detected second network control message for transmitting data messages over said second transmission network whenever the station has a data message to send thereover.

2. Communication system according to claim 1, characterized in that each station (21) attached to said second network (13) comprises:
   a substation (101) corresponding to said first stations (17) that are connected only to said first transmission network and having means to recognize and modify second network control messages,
   interface means (111) for connecting a utilization device (109) to said second network (13), and
   control means (145) for controlling data transfers between said utilization device (109) and said second network (13) and being responsive to access information (120) furnished by said substation (101).

3. Communication system according to claim 2, characterized in that
   said control means (145) includes means (150) for recognizing the end of a transmitted data block and means (121) for transferring a respective end indication to said substation (101).

4. Communication system according to claim 2, characterized in that said interface means (111) includes means (145) for attaching to a data block received from said utilization device (109) for transmission, an address and delimiters and leading and trailing signal patterns.

5. Communication system according to claim 1, characterized in that
   said first transmission network (11) is a token ring and includes a token manager (27) having means for releasing network control messages including tokens of at least a first and a second kind, and means to reserve any passing token within a network control message.
   said token manager (27) includes means for storing the status of a first kind of token when it returns after one circulation and to release thereafter a second kind token, and
   said token manager (27) further includes means to issue a first kind token at regular intervals, after receiving a previously reserved other kind token, with a status that corresponds to the stored token status.

6. Communication system according to claim 5, characterized in that each station (21) attached to said second network (13) includes means for
   recognizing on said first network (11) any token of said first kind, for
   changing a received first kind token's status to busy if it was free, and to start transmitting on said second network (13) if a send request was pending, and for changing a received first kind token's status to free if it was busy after finishing a transmission on said second network (13).

7. A communication system as set forth in claim 1 in which:
said first transmission network (11) is a token ring transmission network, and
said first and second network control messages each include a unique token field.

8. A communication system as set forth in claim 7 in which:
said first and second decoding means are inserted into the first network and modify the token field of said first and second network control messages, respectively, as they propagate through the station so that the token field will not be recognizable as available by subsequent stations in the network.

9. A communication system as set forth in claim 1 or 7 or 8 in which:
said second transmission network is a ring transmission network and includes;
a plurality of access nodes connected in the ring each for attaching at least one of said second stations to the ring and each said access node including means for interrupting the ring when an attached station has received a said second network control message and has data to transmit over the said second ring transmission network.

10. Communication system comprising a first data transmission network (11) for small-volume data transfers and a separate second data transmission network (13) for high-speed large-volume data transfers, characterized in that
said second network (13) is an optical fiber transmission network and comprises access nodes (23) each for attaching a group of stations (21), that
common optical output means (45, 47) are provided at each said access node for transferring optical data signals directly from the second network in parallel to stations of the respective group, that
optical input means (53, 55) are provided at each said access node for transferring optical data signals from any of the attached stations to said second network, and that
means are provided in each said station (101, 145) for receiving access information from said first network for controlling data transfers from the respective station to said second network in response to said access information.

11. Communication system according to claim 10, characterized in that said first (11) and second (13) network are both transmission rings.

12. Communication system according to claim 10 or 10, characterized in that each station (21) that is attached to both networks (11, 13) includes a first portion (101) for recognizing and modifying token indications propagating on said first network (11), and for issuing an access indication (130) in response to a free token indication, and a second portion (111) for transferring a data block from a utilization device (103) in said station to an access node (23) in said second network (13), in response to an access indication (120) from said first portion (101).

13. Communication network according to claim 10 or 11, characterized in that each said access node (23) comprises switching means (39) having two positions, which in the first position close a transmission path (13) between an incoming and an outgoing branch of said second network (13),
buffering means (63, 65) which has its input connected to said optical input means (53, 55) for receiving data from any sending station, and which has its output connected to said second position of said switching means (39), connecting it to the outgoing branch of said second network (13), and
control means (71) for changing the setting of said switching means in response to an indication (77) of a transmission from one of said stations.

14. In a communication system comprising two separate networks (11, 13) each for transferring data between stations (17, 21) attached to the respective network, a method for regulating data transmission access to one of said networks (13), comprising the steps of
receiving access information at one network (13) from stations attached to it and then transmitting access information to the other (11) of said two networks, whereby access information for said one network (13) is transferred only over said other network (11);
issuing tokens of at least a first and a second kind on said other network (11) by a token manager (27) wherein said token manager (27) regulates access to said one network (13) and said other network (11), respectively;
issuing a first kind token from said token manager (27) with the same status (busy/free) as the last such token had when returning to the token manager (27) wherein said first kind token circulates through all stations and returns to the token manager which stores its status;
changing the next first kind of token that said station manager (27) receives free to busy, forwarding it on the other network (11) and starting transmission on the one network (13) when stations want to transmit on the one network (13);
changing the next first kind of token said station manager (27) receives busy to free and forwarding it on the other network (11) when stations want to end a transmission on the one network (13);
whereby during the time interval while a station (21) is transmitting on the one network (13) a first kind of token may be circulating on the other network (11) in a busy status without being changed.

15. A method according to claim 14 comprising the step of
issuing a free second kind of token for granting access to the other network (11) after the return of a first kind of token and independent of the status (busy/free) of said returned first kind of token.

16. A method of operating a communication system having a first network connected to first and second groups of data transmitting and receiving stations and a second network connected only to said second group of data transmitting and receiving stations comprising the steps of:
exchanging messages between the first group of stations over the first network under control of first network control messages including a token field which are transmitted over the first network; and
exchanging messages between the second group of stations over the second network under control of second network control messages including a token field transmitted over the said first network.

* * * * *